United States Patent
Wieber

(10) Patent No.: US 7,004,536 B2
(45) Date of Patent: Feb. 28, 2006

(54) ATTACHMENT SYSTEM AND METHOD OF FORMING SAME

(75) Inventor: Robert Wieber, Lapeer, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/606,602

(22) Filed: Jun. 26, 2003

(65) Prior Publication Data

US 2004/0046423 A1 Mar. 11, 2004

Related U.S. Application Data

(60) Provisional application No. 60/399,223, filed on Jul. 29, 2002.

(51) Int. Cl.
*B60J 7/00* (2006.01)
(52) U.S. Cl. .................... 296/210; 296/146.6
(58) Field of Classification Search ............... 296/210, 296/201, 93, 96.21, 29, 220.01, 146.6; 52/204.597, 52/402.01, 208, 520, 747.1, 60, 733.4; 425/145; 156/293, 275.7; 428/413; 29/897.2
See application file for complete search history.

(56) References Cited

U.S. PATENT DOCUMENTS

| | | | |
|---|---|---|---|
| 4,463,870 A | | 8/1984 | Coburn, Jr. et al. |
| 4,471,519 A | * | 9/1984 | Capello et al. ............. 296/210 |
| 4,475,765 A | * | 10/1984 | Vogt et al. .................. 296/210 |
| 4,598,008 A | | 7/1986 | Vogt et al. |
| 4,610,836 A | | 9/1986 | Wycech |
| 4,751,249 A | | 6/1988 | Wycech |
| 4,769,391 A | | 9/1988 | Wycech |
| 4,813,690 A | | 3/1989 | Coburn, Jr. |
| 4,836,516 A | | 6/1989 | Wycech |
| 4,853,270 A | | 8/1989 | Wycech |
| 4,861,097 A | | 8/1989 | Wycech |
| 4,867,271 A | | 9/1989 | Tschudin-Mahrer |
| 4,922,596 A | * | 5/1990 | Wycech ..................... 29/897.2 |
| 4,923,902 A | | 5/1990 | Wycech |
| 4,978,562 A | * | 12/1990 | Wycech .................... 296/146.6 |
| 5,124,186 A | * | 6/1992 | Wycech .................... 296/146.6 |
| 5,209,541 A | * | 5/1993 | Janotik ....................... 296/209 |
| 5,266,133 A | | 11/1993 | Hanley et al. |
| 5,320,403 A | * | 6/1994 | Kazyak .................. 296/203.01 |
| 5,349,801 A | * | 9/1994 | Verbofsky ..................... 52/518 |
| 5,358,397 A | * | 10/1994 | Ligon et al. ................. 425/145 |
| 5,382,397 A | | 1/1995 | Turner, Jr. |
| 5,455,096 A | * | 10/1995 | Toni et al. ................... 428/116 |
| 5,506,025 A | | 4/1996 | Otto et al. |
| 5,575,526 A | | 11/1996 | Wycech |
| 5,755,486 A | | 5/1998 | Wycech |

(Continued)

FOREIGN PATENT DOCUMENTS

DE 29 19 046 11/1980

(Continued)

OTHER PUBLICATIONS

Copending U.S. Appl. No. 09/459,756 filed Dec. 10, 1999.

(Continued)

*Primary Examiner*—Kiran B. Patel
(74) *Attorney, Agent, or Firm*—Dobrusin & Thennisch PC

(57) ABSTRACT

The present invention provides an improved attachment system and a method of forming the same. The attachment system typically includes a first member having a first attachment surface and a second member having a second attachment surface. A structural adhesive material is adhered to the first attachment surface and the second attachment surface. Moreover, a sealing material typically seals a gap between the first member and the second member.

26 Claims, 3 Drawing Sheets

U.S. PATENT DOCUMENTS

| | | | |
|---|---|---|---|
| 5,766,719 A | 6/1998 | Rimkus | |
| 5,791,726 A * | 8/1998 | Kaufman | 296/182.1 |
| 5,804,608 A | 9/1998 | Nakazato et al. | |
| 5,845,387 A * | 12/1998 | Bonnett et al. | 29/527.1 |
| 5,884,960 A * | 3/1999 | Wycech | 296/146.6 |
| 5,888,600 A | 3/1999 | Wycech | |
| 5,892,187 A | 4/1999 | Patrick | |
| 5,932,680 A | 8/1999 | Heider | |
| 5,985,435 A | 11/1999 | Czaplicki et al. | |
| 5,992,923 A | 11/1999 | Wycech | |
| 6,003,274 A | 12/1999 | Wycech | |
| 6,006,484 A | 12/1999 | Geissbuhler | |
| 6,027,160 A * | 2/2000 | Brodt et al. | 296/210 |
| 6,033,300 A | 3/2000 | Schneider | |
| 6,068,424 A | 5/2000 | Wycech | |
| 6,079,180 A | 6/2000 | Wycech | |
| 6,092,864 A | 7/2000 | Wycech et al. | |
| 6,096,403 A | 8/2000 | Wycech | |
| 6,099,948 A | 8/2000 | Paver, Jr. | |
| 6,103,341 A | 8/2000 | Barz et al. | |
| 6,131,897 A | 10/2000 | Barz et al. | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche et al. | |
| 6,199,940 B1 | 3/2001 | Hopton et al. | |
| 6,207,244 B1 | 3/2001 | Hesch | |
| 6,233,826 B1 | 5/2001 | Wycech | |
| 6,237,304 B1 | 5/2001 | Wycech | |
| 6,244,601 B1 | 6/2001 | Buchholz et al. | |
| 6,253,524 B1 | 7/2001 | Hopton et al. | |
| 6,263,635 B1 | 7/2001 | Czaplicki | |
| 6,267,436 B1 | 7/2001 | Takahara | |
| 6,270,600 B1 * | 8/2001 | Wycech | 156/79 |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,340,204 B1 * | 1/2002 | Seifert | 296/210 |
| 6,341,467 B1 | 1/2002 | Wycech | |
| 6,350,791 B1 | 2/2002 | Feichtmeier et al. | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 * | 6/2002 | Wycech | 52/735.1 |
| 6,413,611 B1 | 7/2002 | Roberts et al. | |
| 6,419,305 B1 * | 7/2002 | Larsen | 296/203.03 |
| 6,422,575 B1 | 7/2002 | Czaplicki et al. | |
| 6,439,649 B1 * | 8/2002 | Lorenzo et al. | 296/181.3 |
| H2047 H | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B1 | 11/2002 | Barz | |
| 6,474,723 B1 | 11/2002 | Czaplicki et al. | |
| 6,475,577 B1 | 11/2002 | Hopton et al. | |
| 6,478,367 B1 | 11/2002 | Ishikawa | |
| 6,482,486 B1 | 11/2002 | Czaplicki et al. | |
| 6,482,496 B1 | 11/2002 | Wycech | |
| 6,489,023 B1 | 12/2002 | Shinozaki et al. | |
| 6,502,821 B1 | 1/2003 | Schneider | |
| 6,519,854 B1 | 2/2003 | Blank | |
| 6,523,857 B1 | 2/2003 | Hopton et al. | |
| 6,523,884 B1 | 2/2003 | Czaplicki et al. | |
| 6,546,693 B1 | 4/2003 | Wycech | |
| 6,561,571 B1 | 5/2003 | Brennecke | |
| 6,573,309 B1 | 6/2003 | Reitenbach et al. | |
| 6,575,526 B1 | 6/2003 | Czaplicki et al. | |
| 6,607,238 B1 | 8/2003 | Barz | |
| 6,619,727 B1 | 9/2003 | Barz et al. | |
| 6,634,698 B1 | 10/2003 | Kleino | |
| 6,641,208 B1 | 11/2003 | Czaplicki et al. | |
| 6,668,457 B1 | 12/2003 | Czaplicki | |
| 6,679,540 B1 * | 1/2004 | Graber et al. | 296/146.6 |
| 6,682,818 B1 * | 1/2004 | Czaplicki et al. | 428/413 |
| 6,691,468 B1 | 2/2004 | Helferty | |
| 6,692,347 B1 | 2/2004 | Schneider | |
| 6,708,979 B1 | 3/2004 | Stratman et al. | |
| 6,720,387 B1 | 4/2004 | Stark et al. | |
| 6,729,425 B1 | 5/2004 | Schneider | |
| 6,742,258 B1 | 6/2004 | Tarbutton et al. | |
| 6,747,074 B1 | 6/2004 | Buckingham et al. | |
| 6,748,667 B1 | 6/2004 | Sevastian | |
| 6,793,274 B1 | 9/2004 | Riley et al. | |
| 6,811,864 B1 | 11/2004 | Czaplicki et al. | |
| 6,820,923 B1 | 11/2004 | Bock | |
| 2001/0020794 A1 | 9/2001 | Ishikawa | |
| 2002/0053179 A1 | 5/2002 | Wycech | |
| 2002/0074827 A1 | 6/2002 | Fitzgerald et al. | |
| 2003/0001469 A1 | 1/2003 | Hankins et al. | |
| 2003/0039792 A1 | 2/2003 | Hable et al. | |
| 2003/0042056 A1 | 3/2003 | Schneider et al. | |
| 2003/0049453 A1 | 3/2003 | Czaplicki et al. | |
| 2003/0057737 A1 | 3/2003 | Bock et al. | |
| 2003/0069335 A1 | 4/2003 | Czaplicki et al. | |
| 2003/0090129 A1 | 5/2003 | Riley et al. | |
| 2003/0140671 A1 | 7/2003 | Lande et al. | |
| 2003/0144409 A1 | 7/2003 | Kassa et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0186049 A1 | 10/2003 | Czaplicki et al. | |
| 2003/0201572 A1 | 10/2003 | Coon et al. | |
| 2004/0016564 A1 | 1/2004 | Lambert, Jr. | |
| 2004/0033324 A1 | 2/2004 | Meyer | |
| 2004/0074150 A1 | 4/2004 | Wycech | |
| 2004/0079478 A1 * | 4/2004 | Merz | 156/275.7 |
| 2004/0221953 A1 * | 11/2004 | Czaplicki et al. | 156/293 |

FOREIGN PATENT DOCUMENTS

| | | |
|---|---|---|
| DE | 34 20 781 A1 | 1/1985 |
| DE | 198 12 288 | 5/1999 |
| DE | 198 56 255 | 1/2000 |
| DE | 198 58 903 | 6/2000 |
| EP | 0 414 302 A1 | 2/1991 |
| EP | 0 775 721 A1 | 5/1997 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 134 126 B1 | 3/2001 |
| EP | 1 108 640 A2 | 6/2001 |
| EP | 1 122 156 A2 | 8/2001 |
| EP | 0 893 332 B1 | 3/2002 |
| EP | 1 362 683 A2 | 11/2003 |
| EP | 1 362 769 A1 | 11/2003 |
| EP | 0 742 814 B1 | 1/2004 |
| EP | 1 240 266 B1 | 2/2004 |
| EP | 1 475 295 A2 | 11/2004 |
| FR | 2115177 | 7/1972 |

| | | |
|---|---|---|
| FR | 2 749 263 | 5/1996 |
| GB | 2 156 412 A | 10/1985 |
| GB | 2 375 328 | 11/2002 |
| JP | 63-231913 | 9/1988 |
| JP | 2001-88739 | 4/2001 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 00/13958 | 3/2000 |
| WO | WO 00/27920 | 5/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/54936 | 8/2001 |
| WO | WO 01/71225 | 9/2001 |
| WO | WO 01/83206 | 11/2001 |
| WO | WO 01/88033 | 11/2001 |
| WO | WO 02/086003 A1 | 10/2002 |
| WO | WO 03/011954 A1 | 2/2003 |
| WO | WO 03/042024 A1 | 5/2003 |
| WO | WO 03/061934 | 7/2003 |
| WO | WO 03/072677 A1 | 9/2003 |
| WO | WO 03/078163 | 9/2003 |
| WO | WO 03/093387 A1 | 11/2003 |
| WO | WO 03/103921 A1 | 12/2003 |
| WO | WO 2004/037509 A1 | 5/2004 |

OTHER PUBLICATIONS

Copending U.S. Appl. No. 09/631,211 filed Aug. 3, 2000.
Copending U.S. Appl. No. 10/233,919 filed Sep. 3, 2002.
Copending U.S. Appl. No. 10/008,505 filed Nov. 8, 2001.
Copending U.S. Appl. No. 10/008,194 filed Nov. 8, 2001.
Copending U.S. Appl. No. 10/404,831 filed Apr. 1, 2003.
Copending U.S. Appl. No. 10/430,964 filed May 6, 2003.
Copending U.S. Appl. No. 10/617,058 filed Jul. 10, 2003.
Copending U.S. Appl. No. 10/621,209 filed Jul. 16, 2003.
Copending European Application Serial No. 0130439.3 filed Dec. 20, 2001.
Copending European Application Serial No. 0211268.8 filed May 17, 2002.
Copending European Application Serial No. 0211287.8 filed May 17, 2002.
European Search Report dated May 10, 2004, for Application No. 03016385.
Copending Provisional U.S. Appl. No. 60/577,027 filed Jun. 4, 2004.
Copending Provisional U.S. Appl. No. 60/558,594 filed Apr. 1, 2004.

* cited by examiner

ATTACHMENT SYSTEM AND METHOD OF FORMING SAME

CLAIM OF BENEFIT OF FILING DATE

The present application claims the benefit of the filing date of U.S. Provisional Application Ser. No. 60/399,223 (filed Jul. 29, 2002), hereby incorporated by reference.

FIELD OF THE INVENTION

The present invention relates generally to an attachment for joining members of an article of manufacture and a method of forming the same. More particularly, the present invention relates to an attachment system for joining a roof of an automotive vehicle with one or more body panels of the vehicle.

BACKGROUND OF THE INVENTION

For many years, the transportation industry has been concerned with designing attachment systems for members or components of automotive vehicles. More recently, such attachment systems have been configured to provide baffling, sealing, structural reinforcement or the like in addition to providing attachment for the components of the vehicle. For designing such attachment systems, various competing factors may be taken into account. For example, and without limitation, such factors may include strength of attachment between components, cost of the attachment system, aesthetic appearance of the system, combinations thereof or the like. Thus, the present invention seeks to provide an improved attachment system that takes into account one or more of these factors.

SUMMARY OF THE INVENTION

The present invention is directed to an attachment system that has particular utility for joining components of an automotive vehicle. According to one preferred aspect of the invention, the attachment system includes one or more panels of a roof of the automotive vehicle and one or more body panels (e.g., outer side body panels) of the vehicle. The panels of the system will each typically include one or more flanges that cooperatively form one or more gaps when the panels are positioned relative to each other. The one or more gaps are preferably at least partially filled with a strip of adhesive material and a strip of sealant material. The gap filled by the sealant material typically opens toward the environment surrounding the vehicle. Thus, the sealant material, once positioned within the gap, is typically exposed to the environment surrounding the vehicle. In turn, it is preferable for the sealant to provide a paintable or coatable surface such that the sealant provides an aesthetically pleasing painted or otherwise coated surface if desired. In particular, it is preferable for the sealant to be paintable with a Class B or Class A finish.

Generally speaking, the attachment system may utilize technology and processes such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, all of which are expressly incorporated by reference. Preferably the sealant and/or adhesive materials of the present invention are an energy absorbing medium, and a heat activated bonding material. The adhesive material may be a foamable or expandable material, which could comprise an epoxy-based resin, such as L5204, L5206, L5207, L5208 or L5209 structural foam commercially available from L & L Products of Romeo, Mich. Additional foamable or expandable materials that could be utilized in the present invention include other materials which are suitable as bonding mediums and which may be heat activated foams which activate and expand to fill a desired cavity or occupy a desired space or function when exposed to temperatures typically encountered in automotive e-coat and other paint operations.

Though other heat-activated materials are possible, preferred heat activated materials for the sealant and or adhesive materials are expandable or non-expandable, but preferably flowable polymeric formulations, and preferably activated to foam, flow or otherwise change states when exposed to the heating operation of a typical automotive assembly painting operation. For example, without limitation, in one embodiment, the materials may be polymeric foams based on ethylene copolymers or terpolymers that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L-2411, L-2412, L-4141, L-3050, L-3051, L-3052 etc. and may comprise either open or closed cell polymeric base material.

It is contemplated that the sealant and/or adhesive materials could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium includes or is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon providing an improved attachment system for interconnecting one or more members of an article of manufacture. The attachment system has found particular utility for automotive vehicles although it is contemplated that the system may be applied to a variety of articles of manufacture such as airplanes, boats, buildings, furniture or the like.

Accordingly, the attachment system of the present invention typically include one or more of the following:

1) a first member (e.g., an automotive vehicle panel) having a surface;
2) a second member (e.g., another automotive vehicle panel) having a surface configured to oppose the surface of the first member;
3) an adhesive material, which is preferably expandable, abuttingly contacting the surface of the first member and the surface of the second member; and
4) optionally, a sealant material positioned to seal a gap between the first member and the second member.

Figures 1, 2:
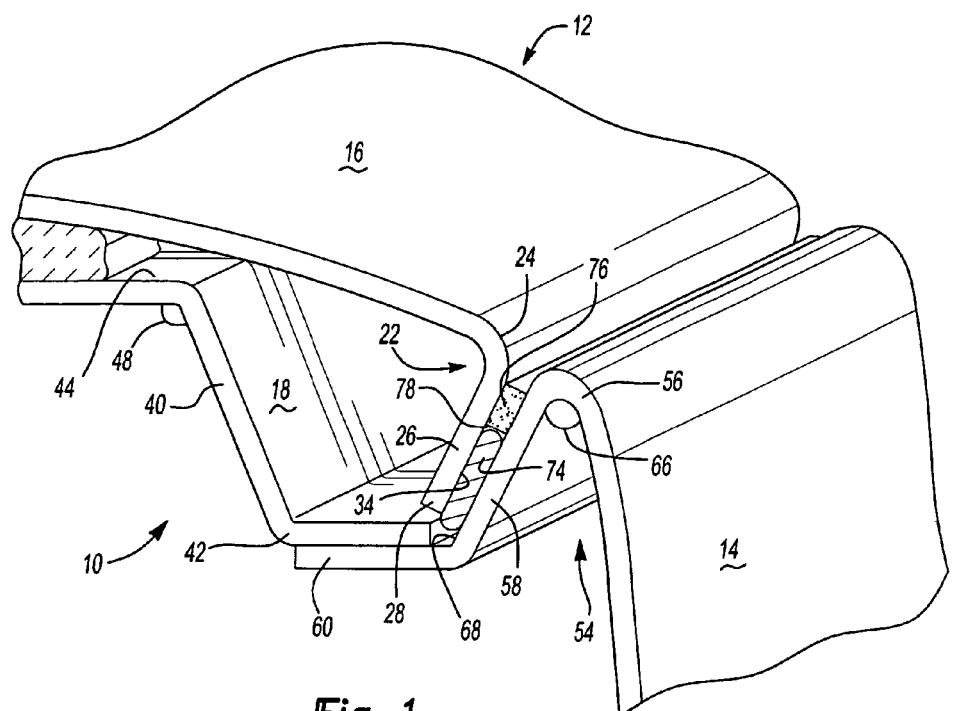
FIG. 1 is a cut-away perspective sectional view of an exemplary attachment system according to a preferred aspect of the present invention.
FIG. 2 is a cut-away perspective sectional view of another exemplary attachment system according to a preferred aspect of the present invention.

Referring to FIG. 1, there is illustrated one preferred embodiment of an attachment system 10 formed in accordance with the present invention. The system includes a first member shown as a roof 12 of an automotive vehicle and a second member shown as at least one body panel 14 of the vehicle. In the embodiment shown, the roof 12 includes a first outer roof panel 16 (e.g., the outer roof body panel) generally opposing a second inner roof panel 18 (e.g., the roof bow) although it is contemplated that the roof 12 may include only one panel.

The at least one body panel 14 may be a roof rail, a side body panel (e.g., a quarter panel, side panel or door panel) or the like. In the embodiment illustrated, the attachment system 10 is only depicted for one side of the vehicle, however, it is of course contemplated that the system 10 may be applied to both sides of the vehicle and possibly the front and rear edges of the roof 12.

In the exemplary embodiment of FIG. 1, the outer roof body panel 16 is oriented substantially horizontally and is generally arcuate as it spans the roof 12 of the vehicle. A side edge 22 of the roof body panel 16 includes an arcuate portion 24 that connects the roof body panel 16 with a downwardly extending flange 26. Preferably, the flange 26 is substantially coextensive with the side edge 22 of the roof body panel 16 and extends at least partially inwardly back toward the roof body panel 16, the vehicle or both. In the embodiment shown, the flange 26 also includes a distal end 28, which is shown as a free end. The flange 26 also provides an attachment surface 34.

The roof bow panel 18 of the exemplary attachment system 10 of FIG. 1 is also generally arcuate and substantially mirrors the horizontal orientation of the outer roof body panel 16 as it spans the roof 12 of the vehicle, although such is not required. Preferably, the roof bow panel 16 has one or more flanges 40, 42 extending from a side edge 44 of the roof bow panel 18. In the particular embodiment shown, a first flange 40 extends downwardly at an obtuse angle 48 away from the roof bow panel 18 and a second flange 42 extends from an end of the first flange 40 outwardly away from the roof bow panel 18. Also as shown, the second flange 42 extends substantially parallel to the roof bow panel 18.

The outer side body panel 14 of the exemplary attachment system 10 of FIG. 1 is oriented substantially vertically and has a side edge 54 that includes an arcuate portion 56 connecting the outer body panel 14 with one or more flanges 58, 60. In the particular embodiment shown, a first flange 58 extends downwardly at an acute angle 66 from the outer body panel 14 and a second flange 60 extends from an end of the first flange 58 outwardly away from the outer body panel 14. Preferably, the second flange 60 extends substantially perpendicular to the outer body panel 14. As shown, the first flange 58 provides at least one attachment surface 68.

The attachment system 10 illustrated in FIG. 1 also includes at least one adhesive material and at least one sealant material. Preferably, the adhesive material, the sealant material or both are flowable, expandable or both upon exposure to heat. The chemical compositions of the adhesive material and the sealant material are further described below. In FIG. 1, the attachment system 60 includes a strip 74 of adhesive material and a strip 76 of sealant material, both of which extend along the side edges 22, 54 respectively of the outer roof panel 16 and the outer body panel 14. In the preferred embodiment illustrated, both the strip 74 of adhesive material and the strip 76 of sealant material are located within a gap 78 between the attachment surfaces 34, 68 respectively of the flanges 26, 58 of the outer roof panel 14 and the outer side panel 14. Preferably, the sealant material is outside of the adhesive material relative to the vehicle. It is also preferable for the sealant material to be at least partially disposed between the adhesive material and the environment external of the vehicle such that the sealant material prevents the adhesive material from being visible externally of the vehicle. As shown the sealant material may be visible external of the vehicle.

Referring to FIG. 2, there is illustrated an alternative exemplary preferred embodiment of an attachment system 80 in accordance with the present invention. The outer body panel 14 and the roof bow panel 18 are substantially identical to those described in FIG. 1 and have been assigned corresponding numeral designations. However, the attachment system 80 of FIG. 2 includes a different outer roof panel 84, a differently positioned strip 86 of adhesive material and a differently positioned strip 88 of sealant material, all of which have been assigned different numerical designations from the designation in FIG. 1.

The outer roof panel 84 of the exemplary attachment system 80 of FIG. 2 is generally arcuate and substantially mirrors the horizontal orientation of the roof bow panel 18 as it spans the roof 12 of the vehicle, although such is not required. Preferably, the outer roof panel 84 has one or more flanges 90, 92, 94 extending from a side edge 96 of the roof panel 84. In the particular embodiment shown, a first flange 90 extends downwardly at an obtuse angle 98 away from the roof panel 84 and a second flange 92 extends from an end of the first flange 90 outwardly away from the roof panel 84. Additionally, a downwardly extending third flange 94 extends from an end of the second flange 92. Preferably, the second flange 92 extends substantially parallel to the outer roof panel 84, although not required. It is also preferable for the first flanges 40, 90 respectively of the roof bow panel 18 and the outer roof panel 84 to oppose each other and for the second flanges 42, 92 respectively of the roof bow panel 18 and the outer roof panel 84 to oppose each other. Moreover, in the embodiment illustrated, the second flanges 42, 92 respectively include attachment surfaces 110, 112, which also oppose each other.

The strip 86 of adhesive material in the exemplary system 80 of FIG. 2 is preferably located in a gap 116 between the attachment surfaces 110, 112 of the second flanges 42, 92 respectively of the roof bow panel 18 and the outer roof panel 84. The strip 88 of sealant material is preferably located with a gap 118 between the third flange 94 of the outer roof panel 84 and the first flange 58 of the outer body panel 14. In the embodiment shown, both the strip 86 of adhesive material and the strip 88 of sealant material extend continuously or non-continuously adjacent the side edges 54, 96 of the outer roof panel 84 and outer body panel 14.

Figure 3A:
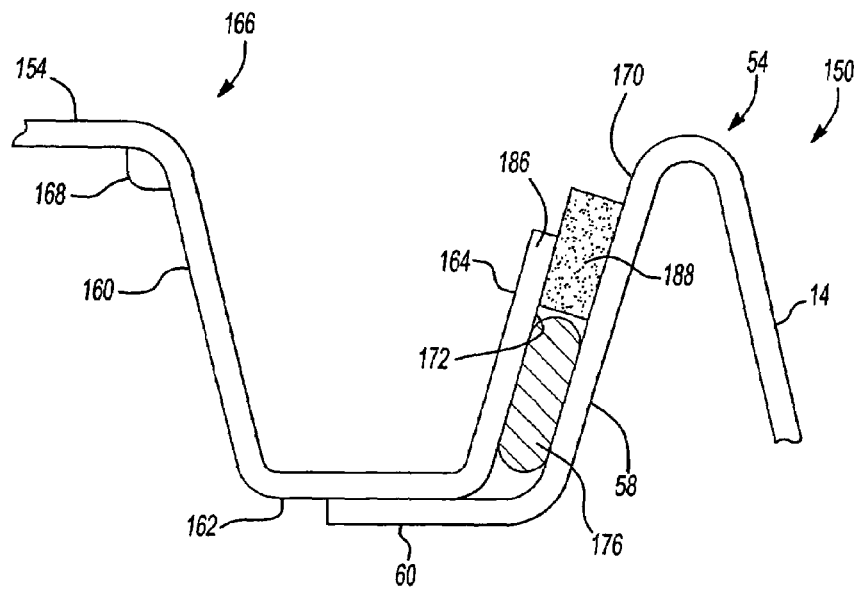
FIG. 3(a) is a sectional view of another exemplary attachment system according to a preferred aspect of the present invention.
Figure 3B:
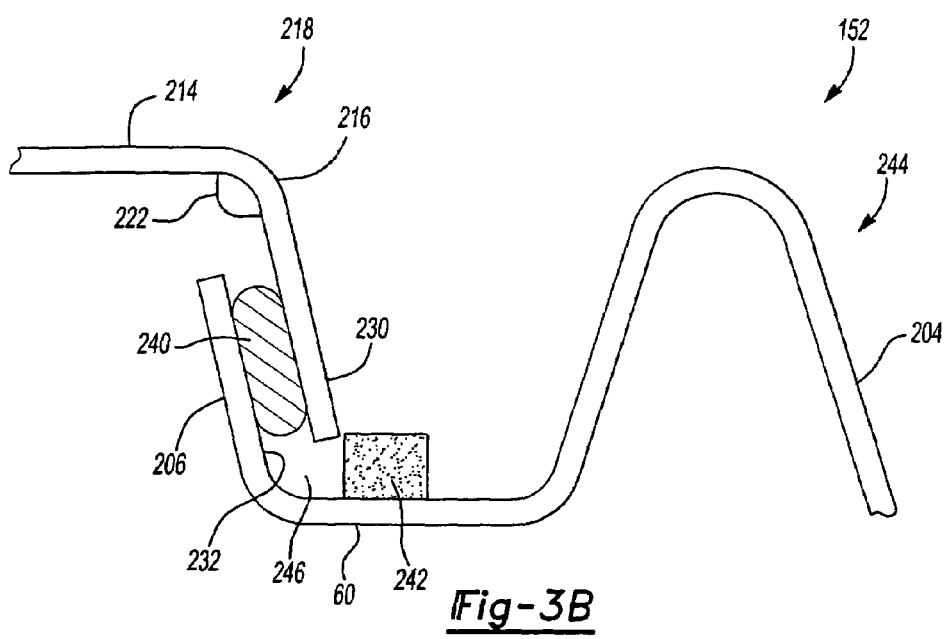
FIG. 3(b) is a sectional view of another exemplary attachment system according to a preferred aspect of the present invention.

In FIGS. 3(a) and 3(b), there are illustrated exemplary alternative attachment systems 150, 152 according to the present invention. The alternative systems 150, 152, which are substantially similar to the systems of FIGS. 1 and 2 with the exception that flanges are arranged differently and the adhesive and/or sealant materials have been placed in different positions. Thus, to avoid repetition, only the flange arrangements and adhesive and/or sealant material positions are discussed.

Referring specifically to FIG. 3(a), the exemplary attachment system 150 illustrated includes the outer body panel 14 as illustrated in FIGS. 1 and 2. The attachment system 150 also includes an outer roof panel 154 that has one or more flanges 160, 162, 164 extending from a side edge 166 of the roof panel 154. In the particular embodiment shown, a first flange 160 extends downwardly at an obtuse angle 168 away from the roof panel 154 and a second flange 162 extends from an end of the first flange 160 outwardly away from the roof panel 154. Additionally, an upwardly extending third flange 164 extends from an end of the second flange 162. Preferably, the second flange 162 extends substantially parallel to the outer roof panel 154. It is also preferable for the third flange 164 of the outer roof panel 154 to oppose the first flange 58 of the outer body panel 14 such that the flanges 164, 58 respectively provide attachment surfaces 170, 172, which also oppose each other.

A strip 176 of adhesive material in the exemplary system 150 of FIG. 3(a) is preferably located in a gap 186 between the attachment surfaces 170, 172 of the first and third flanges 58, 164 respectively of the outer side panel 14 and the outer roof panel 154. A strip 188 of sealant material is also preferably located within the gap 186. Preferably, the sealant material is outside of the adhesive material relative to the vehicle. In the embodiment shown, both the strip 176 of adhesive material and the strip 188 of sealant material extend continuously or non-continuously adjacent the side edges 166, 57 of the outer roof panel 154 and outer body panel 14.

Referring particularly to FIG. 3(b), the exemplary attachment system 152 illustrated includes an outer body panel 204 substantially as illustrated in FIGS. 1 and 2 with the exception that an additional third flange 206 extends upwardly from an end of the second flange 60. The attachment system 152 also includes an outer roof panel 214 that has one or more flanges 216 extending from a side edge 218 of the roof panel 214. In the particular embodiment shown, only a first flange 216 extends downwardly at an obtuse angle 222 away from the roof panel 214. Preferably, the third flange 206 of the body panel 204 extends substantially parallel to the first flange 216 of the roof panel 214. It is also preferable for the first flange 216 of the outer roof panel 214 to oppose the third flange 206 of the outer body panel 204 such that the flanges 216, 206 respectively provide attachment surfaces 230, 232 which also oppose each other.

A strip 240 of adhesive material in the exemplary system 152 of FIG. 3(b) is preferably located in a gap 246 between the attachment surfaces 230, 232 of the first and third flanges 216, 206 respectively of the outer roof panel 214 and the outer side panel 204. A strip 242 of sealant material is also preferably located within or adjacent the gap 246. In the embodiment shown, both the strip 240 of adhesive material and the strip 242 of sealant material extend continuously or non-continuously adjacent side edges 218, 244 of the outer roof panel 214 and outer body panel 204.

It is contemplated that the strip of adhesive material and the strip of sealant material may be formed of the same material and may perform similar and/or different functions. Thus, the adhesive material may be formed of a different material than the sealant material and each of the materials may perform different functions.

It is also contemplated that a single strip of adhesive material may provide the only connection between the automotive panels and may be employed without a separate sealing material. In that case, the adhesive material is preferably capable of exhibiting the properties of the sealant material as well (i.e., may be paintable and aesthetically pleasing). Moreover, such an adhesive material is preferably a non-expandable or only slightly expandable material with strength properties as discussed below.

The adhesive material may be an expandable or foamable material that is activated to expand and then cure to form a strong bond between adjacent surfaces (e.g. attachment surfaces). When expandable, the adhesion material preferably undergoes a volumetric expansion of no greater than 500%, more preferably no greater than 100% and even more preferably no greater than 50% over its original non-expanded volume. Of course, higher expansion levels are also contemplated within the present invention. The adhesive material may also be a non-expandable material, which may or may not be heat activated. Advantageously, lower expansion levels can assist in maintaining smoother more aesthetically pleasing surfaces for the adhesive material, the sealant material or both.

In one embodiment, the adhesive material is formed of a high compressive strength heat activated reinforcement material having foamable characteristics. The material may be generally dry to the touch or tacky and can be placed upon surfaces of members in any form of desired pattern, placement, or thickness, but is preferably a substantially uniform thickness. One exemplary expandable material is L-5204 structural foam available through L&L Products, Inc. of Romeo, Mich. Preferably the strength (e.g., tensile strength) of the adhesive material is at least about 5 Mpa, more preferably at least about 12 Mpa and even more preferably at least about 20 Mpa, although the strength may be lower as well.

Though other heat activated materials are possible for the adhesive material, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam adhesive material. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow. An example of a preferred structural foam formulation for the adhesive material is an epoxy-based material that is commercially available from L&L Products of Romeo, Mich., under the designations L5206, L5207, L5208, L5209, XP321 and XP721.

One advantage of the preferred sealant and adhesive materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch. Moreover, the adhesive and sealant materials may be applied to the attachment surfaces of the panels before or after assembly of the panels to the vehicle or to each other.

The sealant material preferably has one or more characteristic features. For one, the sealant material is preferably at least partially formed of an elastomer or elastomer containing adduct for providing improved sealing and/or aesthetic characteristics to the panels of the vehicle. As such, the sealant material preferably includes at least 30% by weight elastomer, elastomer containing adduct or combination thereof and more preferably at least 50% by weight elastomer, elastomer containing adduct or combination thereof.

Examples of suitable elastomers, which may or may not be included in adducts, include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxyterminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed.

Another desired characteristic for the sealant material is paintability or coatability. In preferred embodiments, the sealant material may be coated or painted to provide a surface of the sealant material with a class B or a class A finish. One example of a suitable sealant material is disclosed in commonly owned patent application Ser. No. 09/939,245, titled Paintable Material, filed on Aug. 24, 2001 herein expressly incorporated by reference for all purposes.

While the preferred materials for fabricating the sealant or adhesive materials have been disclosed, the materials can be formed of other materials as well, provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the sealant material, the adhesive material or both are a heat activated, thermally expanding material, an important consideration involved with the selection and formulation of the material is the temperature at which a material reaction, expansion, activation, flow and possibly curing, will take place. For instance, in most applications, it is undesirable for the material to be reactive at room temperature or otherwise at the ambient temperature in a production line environment. More typically, the material becomes reactive at higher processing temperatures, such as those encountered in an automobile assembly plant, when the material is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable materials have a range of expansion ranging from approximately 0 to over 1000 percent. The level of expansion of the materials may be increased to as high as 1500 percent or more. Typically, strength is obtained from products that possess low expansion.

Some other possible materials for use in the adhesive or sealant include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the material may be provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen structure, panel or beam, and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. No. 09/524,961 or Ser. No. 09/502,686 (hereby incorporated by reference).

During formation of the attachment systems 12, 80, 150, 152 of the present invention, the components (e.g., the roof panels 16, 18 and the outer body panels 14) of the systems are arranged in the configurations as previously described. Thereafter, heat is applied to the systems to at least partially activate (e.g., expand, melt, cure or the like) the adhesive materials and/or the sealant materials for wetting and adhering the materials to the attachment surfaces or other surfaces of the components.

Figure 4:
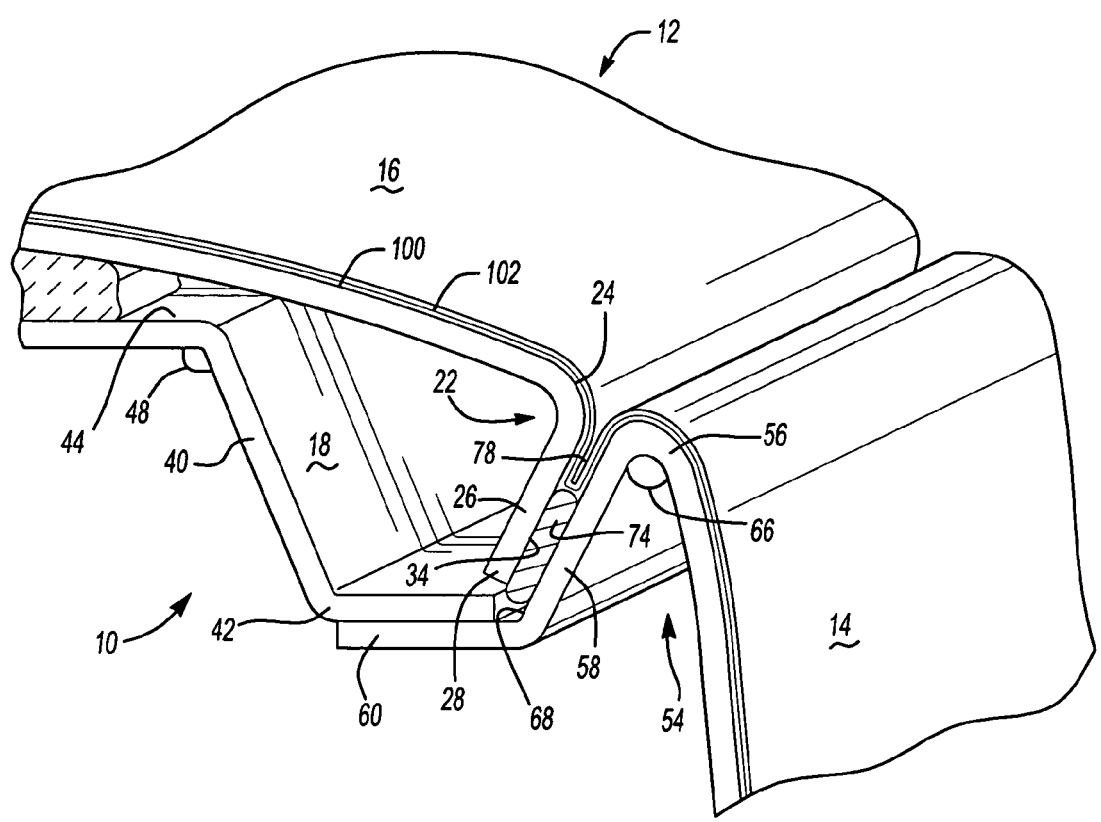
FIG. 4 is a cut-away perspective sectional view of another exemplary attachment system according to the present invention.

As discussed above, it is contemplated that in one embodiment of the attachment system of the present invention, the adhesive material may be employed without the sealant material. In FIG. 4, there is illustrated one example of such a system 300. As shown, the system 300 is identical to the system 10 of FIG. 1, but without the sealant material 76 of FIG. 1. It should be understood, however, that any of the embodiments disclosed herein could be adapted for use without their respective sealing materials, not just the system of FIG. 1. In the system of FIG. 4, it is preferable for the adhesive material to be capable of receiving a primer layer 100, a paint layer 102 or both in a matter that allows the paint to produce a Class A or Class B finish.

In a highly preferred embodiment, the adhesive material, the sealant material or both are applied via an extruder (e.g., a mini-extruder) to one or more surfaces of the compounds prior to positioning the components of the system relative to each other. It is contemplated that the adhesive material may join any combination of the components (i.e., the outer roof panel, the outer body panel, the roof bow panel or the like) together. It is also contemplated that any of these components may also or may only be joined by one or more welds or other attachments. Advantageously, however, the present invention provides an attachment system that may lower the number of welds needed for attachment or may allow for the attachment system to join the members of the system without any welds. Generally, it is contemplated that the attachment system may include less than 20 welds, more preferably less then 10 welds and even more preferably less than 5 welds attaching members of the system together.

Moreover, as discussed, the attachment system of the present invention may be employed for connecting various members of an automotive vehicle. For example, the attachment system may be employed for joining adjacent body panels of a vehicle, for joining inner and outer panels, for joining decklid or trunk panels, for joining panels about a sunroof, for joining door panels, for joining liftgate or endgate panels or the like. It is also contemplated that the attachment system of the present invention may be employed to join frame members to each other or to body members or panels.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An attachment system for an automotive vehicle, comprising:
   a first member having a first flange providing a first attachment surface;
   a second member having a second flange providing a second attachment surface, the second surface opposing the first surface forming a gap therebetween, at least one of the first member and second member being a roof panel of the automotive vehicle; and
   a structural adhesive material adhered to the first surface and the second surface, the structural adhesive material formed from a heat activatable material, the structural adhesive material having a tensile strength of at least 12 MPa.

2. The attachment system as in claim 1 wherein a layer of primer and a layer of paint are disposed directly over the adhesive material concealing the adhesive material from a surrounding environment and providing a Class A or a Class B finish.

3. The attachment system as in claim 2 wherein the structural adhesive material provides substantially the only attachment between the first surface and the second surface.

4. The attachment system as in claim 2 wherein the structural adhesive material is applied to at least one of the first surface and the second surface with a mini-applicator.

5. The attachment system as in claim 4 wherein the mini-applicator includes an extruder.

6. The attachment system as in claim 2 wherein the adhesive material is formed from a heat activatable material that expands at a temperature encountered during at least one of an automotive e-coat and an automotive painting operation.

7. The attachment system as in claim 6 wherein the first or second member is a side panel of the automotive vehicle and the roof panel is attached to the side panel with less than 10 welds.

8. The attachment system as in claim 6 wherein the first or second member is a side panel of the automotive vehicle and the roof panel is attached to the side panel with less than 5 welds.

9. The attachment system as in claim 2 wherein the first member or the second member is a side panel of an automotive vehicle.

10. The attachment system as in claim 2 wherein the roof panel is an outer roof body panel.

11. The attachment system as in claim 2 wherein the structural adhesive material is an epoxy-based structural foam.

12. The attachment system as in claim 6 wherein the structural adhesive material is an epoxy-based structural foam.

13. The attachment system as in claim 6 wherein the flange of the roof panel extends downwardly at an angle relative to the roof panel.

14. The attachment system as in claim 13 wherein the first or second member is a side panel of the automotive vehicle and the flange of the side body panel extends downwardly at an angle from the side body panel.

15. The attachment system as in claim 1 wherein the first member or the second member is a side panel of an automotive vehicle.

16. The attachment system as in claim 1 wherein the first member is attached to the second member with less than 10 welds.

17. The attachment system as in claim 1 wherein the first member is attached to the second member with less than 5 welds.

18. The attachment system as in claim 1 wherein the structural adhesive material provides substantially the only attachment between the attachment surface of the flange of the roof panel and the attachment surface of the flange of the side panel.

19. The attachment system as in claim 1 wherein the structural adhesive material provides attachment between the roof panel and the body panel without the assistance of any welds.

20. The attachment system as in claim 1 wherein the adhesive material extends substantially continuously along the attachment surface of the roof panel.

21. The attachment system as in claim 1 wherein the adhesive material is formed from a heat activatable material that expands at a temperature encountered during at least one of an automotive e-coat and an automotive painting operation.

22. The attachment system as in claim 1 wherein the flange of the roof panel extends downwardly at an angle relative to the roof panel.

23. The attachment system as in claim 1 wherein the first or second member is a side panel of the automotive vehicle and the flange of the side body panel extends downwardly at an angle from the side body panel.

24. The attachment system as in claim 1 wherein the gap is exposed to an environment surrounding the automotive vehicle.

25. The attachment system as in claim 1 wherein the roof panel is an outer roof body panel.

26. The attachment system as in claim 1 wherein the structural adhesive material is an epoxy-based structural foam.

* * * * *